D. C. Slater,
Horse Power,
N° 24,338. Patented June 7, 1859.
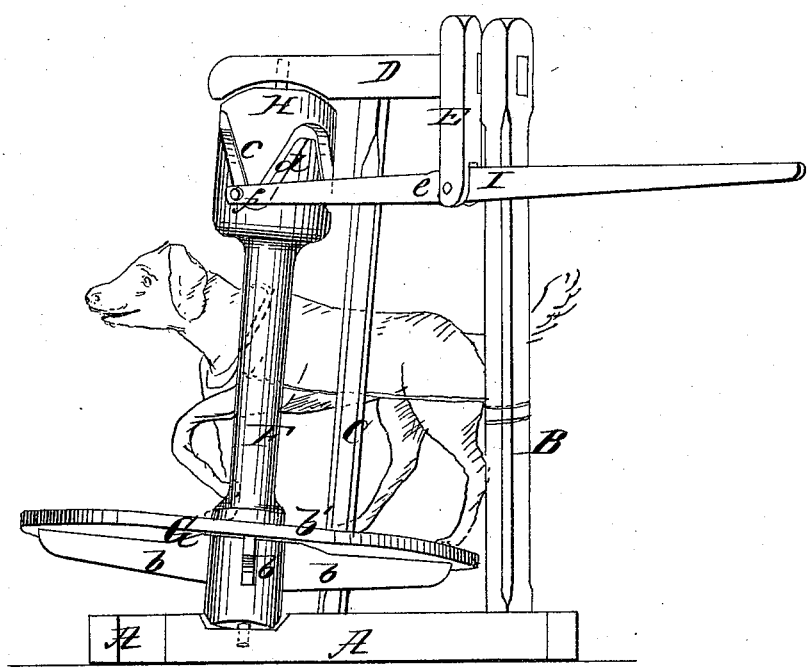
Witnesses
Wm C Fields
Creek Roberts
Inventor
Dexter C Slater

UNITED STATES PATENT OFFICE.

DEXTER C. SLATER, OF LAURENS, NEW YORK.

OPERATING MACHINERY BY DOG-POWER.

Specification of Letters Patent No. 24,338, dated June 7, 1859.

*To all whom it may concern:*

Be it known that I, DEXTER C. SLATER, of Laurens, in the county of Otsego, and State of New York, have invented a new and Improved Dog-Power; and I do hereby declare that the following is a full, clear, and exact description of the same, reference being had to the annexed drawing, making a part of this specification, said drawing being an elevation of my invention.

The object of this invention is to obtain a simple, economical, portable, and efficient device for applying the power of a dog to the propelling of light machinery, such as churns, grind stones, and the like.

The invention consists in the employment or use of an inclined head wheel, shaft, cam and lever, arranged and combined as hereinafter fully shown and described, whereby the desired object is attained.

To enable those skilled in the art to fully understand and construct my invention I will proceed to describe it.

A, A, represent sills connected near their front ends and having two posts B, C, attached to them near their ends, one part B, being vertical and the other C, slightly inclined. The upper ends of these posts are attached to a horizontal bar D, and a pendent E, is attached to said bar D, near its junction with the post B. In one of the sills A, the lower end of an inclined shaft is stepped, the upper end of said shaft having its bearing in the bar D. On the lower end of the shaft F, a wheel G, is placed, said wheel being formed by having arms $b$, pass transversely through the shaft and a circular platform $b'$, attached thereto. The plane of the wheel G, is at right angles to its shaft F, and consequently the wheel is inclined. On the upper part of the shaft F, a cam H, is placed. This cam is formed of a hub $c$, having a zig-zag groove $d$, made in it, said groove extending entirely around the hub. The framing as well as the wheel G, shaft F, and cam H, may all be of wood, but the groove $d$, may be faced with metal strips in order to prevent wear.

I, is a lever which is secured by a fulcrum pin $e$, in the pendant E, and allowed to work freely thereon. The inner end of this lever has a friction roller $f$, attached to it and this roller is fitted in the zig-zag groove $d$, of the cam H.

The operation is as follows:—The dog is placed on the wheel G, and rotates it by the movement of his legs, and the cam H, as it rotates gives a vibrating motion to the lever I, from which the power is taken.

It will be seen that the device is extremely simple and may be constructed by almost any one familiar with tools, as it is composed almost wholly of wood.

The device being composed of but few parts, power is transmitted from the animal to the machine with but little loss from friction.

I do not claim any of the parts when separately considered, but,

I do claim as new and desire to secure by Letters Patent,

The arrangement and combination of the wheel G, shaft F, cam H, and lever I, substantially as and for the purpose set forth.

DEXTER C. SLATER.

Witnesses:
WM. C. FIELDS,
ESEEK ROBERTE.